United States Patent [19]

Babcock et al.

[11] 4,145,669
[45] Mar. 20, 1979

[54] CATHODE ELECTRODE CONFIGURATION FOR GAS LASER SYSTEM

[75] Inventors: Richard V. Babcock, Pittsburgh; John L. Pack, Murrysville; Richard L. Hundstad, Pittsburgh, all of Pa.

[73] Assignee: Westinghouse Electric Corp., Pittsburgh, Pa.

[21] Appl. No.: 767,246

[22] Filed: Feb. 10, 1977

[51] Int. Cl.$^2$ ............................................. H01S 3/097
[52] U.S. Cl. ............................................ 331/94.5 PE
[58] Field of Search .................. 331/94.5 G, 94.5 PE

[56] References Cited

U.S. PATENT DOCUMENTS 3,781,712  12/1973  Judd ............................... 331/94.5 G

*Primary Examiner*—William L. Sikes
*Attorney, Agent, or Firm*—M. P. Lynch

[57] ABSTRACT

The complexity of the conventional X-Y array of pin type cathode electrode elements employed in high-power gas laser systems, is reduced by substituting a continuous elongated cathode electrode element for one or more rows of discrete pin type cathode elements.

2 Claims, 6 Drawing Figures

LASER GAS FLOW →

LASER GAS FLOW →

CATHODE ELECTRODE CONFIGURATION FOR GAS LASER SYSTEM

BACKGROUND OF THE INVENTION

A laser electrode assembly comprised of an X-Y array of cathode pin elements and a planar anode electrode for use in a high pressure gas laser is disclosed in detail in U.S. patent application Ser. No. 674,254, entitled "DC Excitation Of High Pressure Gas Lasers," filed Apr. 6, 1976 as a continuation of application Ser. No. 365,387, filed May 30, 1973, and assigned to the assignee of the present invention. This application, which is being incorporated herein by reference, discloses the advantages of the cathode pin element array in a flowing laser gas system and discusses the requirements for ballasting the individual pins through the use of discrete resistors associated with each of the pin elements comprising the rows and colums of the array.

Typical X-Y arrays consist of 300 or more discrete cathode elements pin with a separate ballast resistor associated with each of the pin elements. Each of the ballast resistors must meet stringent requirements including:
1. dissipating up to 30% of the input energy to the discharge;
2. be of minimal size in order to permit a large number of pin electrodes to be assembled with densities of up to several pins per square centimeters;
3. withstand momentary high currents in voltage in the event of arc instability; and
4. exhibit sufficient insulation to prevent electrical flashover to nearby resistors as well as surrounding parts of the laser system.

The individual ballasting of the pin electrodes of an X-Y array is both expensive and complex.

SUMMARY OF THE INVENTION

There is disclosed herein with reference to the accompanying drawings a technique for reducing the ballast requirements of a conventional X-Y of cathode pin elements by substituting a continuous elongated cathode element for one or more rows of the discrete cathode pin elements.

The combination of one or more rows of discrete cathode pin elements in an upstream position within the laser cavity, and one or more elongated continuous cathode elements replacing downstream rows of discrete cathode pin elements of the conventional X-Y array, effectively enables the upstream row of discrete cathode pin elements to function in a pre-ionizing manner and maintaining desired homogeneity. The resulting cathode electrode arrangement provides a stable, uniform discharge at current densities approximating the current densities available from the conventional X-Y array of discrete cathode pin elements while simplifying the ballast requirements.

DESCRIPTION OF THE DRAWINGS

The invention will become more readily apparent from the following examplary description taken in connection with the accompanying drawings.

DESCRIPTION OF THE PREFERRED EMBODIMENT

Figure 1:
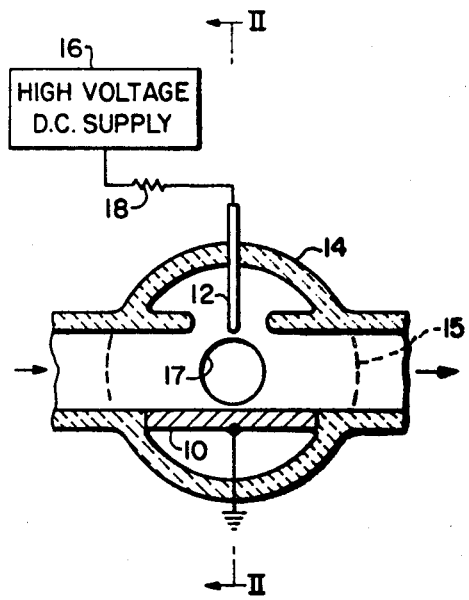
FIGS. 1 and 2 are sectioned illustrations of a Prior Art embodiment of a high power gas flow laser apparatus employing a linear array of individually ballasted pin elements as the cathode electrode.
Figure 2:
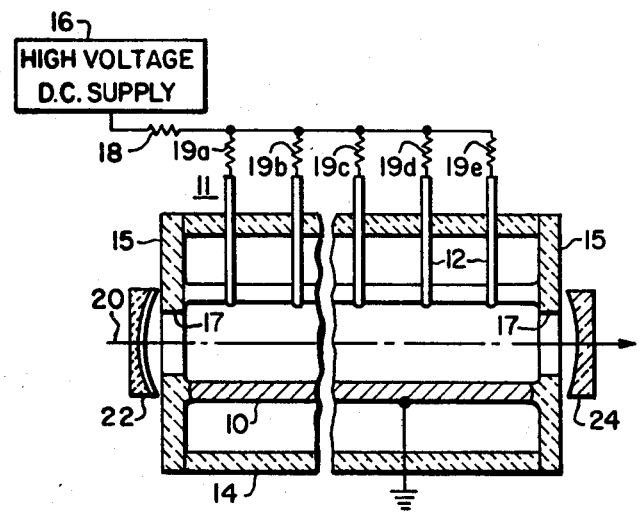

The Prior Art laser system of FIG. 1 utilizes a pin-plane electrode geometry having a gas flow transverse to the optical axis which enables the gas laser to operate under conditions of DC excitation at relatively high pressures, i.e., one atmosphere and above. In FIG. 1, anode electrode 10 is a planar surface continuous electrode maintained at a reference potential such as ground. Set opposite and perpendicular to electrode 10, as more clearly apparent in FIG. 2, is a cathode electrode 11 consisting of a row of cathode pin elements 12 spaced apart from electrode 10 to define a discharge gap or volume therebetween. The electrode assembly is positioned in a laser housing 14 having end walls 15 and apertures 17 in the end walls 15. The gas flow is shown transverse to the discharge gap defined between electrodes 10 and 1. The high voltage DC power supply 16 is connected through resistor 18 to the cathode pin elements 12, each of which is individually ballasted by resistors 19a, 19b, 19c, 19d and 19e and so adapted to establish an electric field between electrodes 10 and 1.

Figure 3:
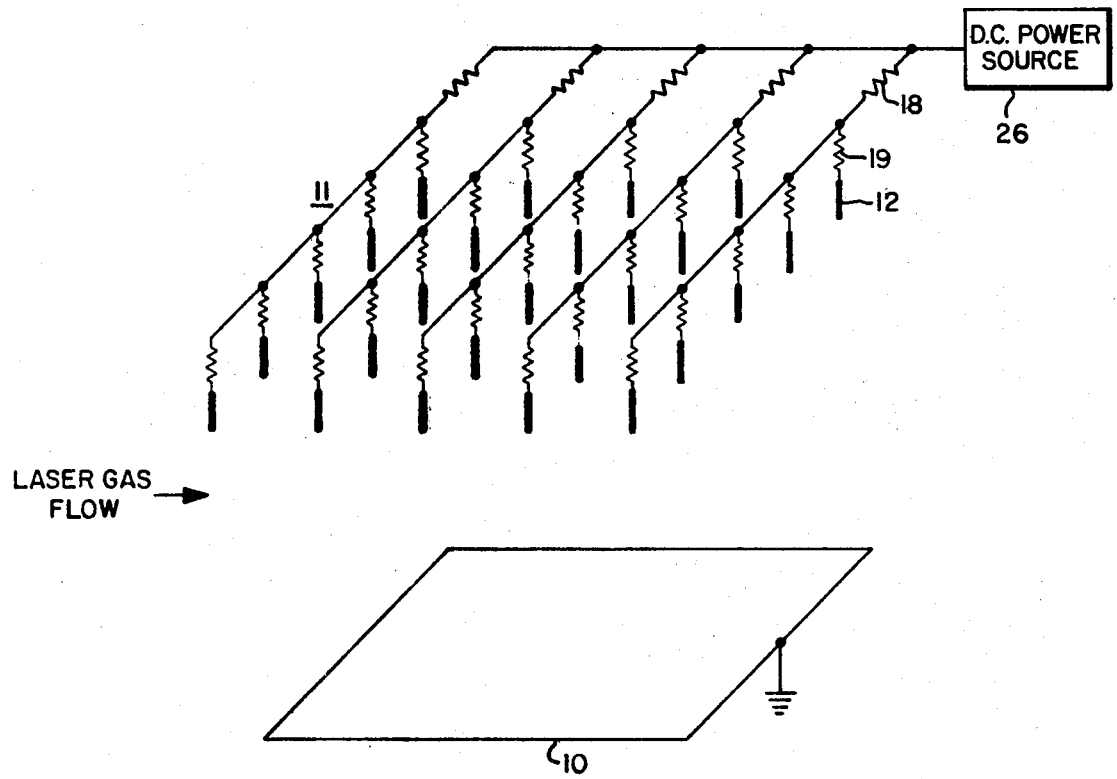
FIG. 3 is a Prior Art illustration of an X-Y array of pin elements for use as the cathode electrode in a high power gas flow laser system.

The cathode pin elements 12 disclosed in the Prior Art illustrations of FIGS. 1, 2 and 3 operate to provide discrete current sources. The individual cathode pin elements function to divide the total cross section of the discharge volume thereby giving greater selective control over the distribution of the power developed in the discharge volume.

In FIG. 2, the optical axis 20 of the laser system runs parallel to the planar surface of the electrode 10 and is aligned longitudinally with the discharge gap defined by the electrodes 10 and 1. An optical cavity is defined between the optical elements 22 and 24 located at either end of the laser housing 14 and aligned with apertures 17. Optical element 22 typically of completely reflecting while element 24 is partially reflecting and partially transmissive to couple coherent energy out of the laser cavity. In the Prior Art illustrations of FIGS. 1 and 2, the flow of the laser gas is transverse to the discharge between the cathode electrode 11 and the planar anode electrode 10.

The application of DC voltage to the electrodes 11 and 12, while the laser gas is flowing, produces a glow discharge between the electrodes inducing laser action by excitation of the gas. The glow discharge is established along the axis of the optical cavity. A typical gas laser flow system, while not shown, contains pumping means to move the gas at some selective velocity, heat exhanger means for cooling the gas and means for recycling the gas to the system. Implementation of a typical flow system is well known in the art.

The Prior Art embodiment of FIG. 3 is a schematic illustration of an electrode assembly wherein the linear array of cathode pin elements 12 of FIGS. 1 and 2 is replaced by an X-Y array of cathode pin elements 12 and associated discrete ballast resistors 19. The X-Y array of FIG. 3 consists of rows of cathode pin elements 19 extending perpendicular to the laser gas flow and being coupled to the DC power source via a current limiting resistor 18.

Figure 4:
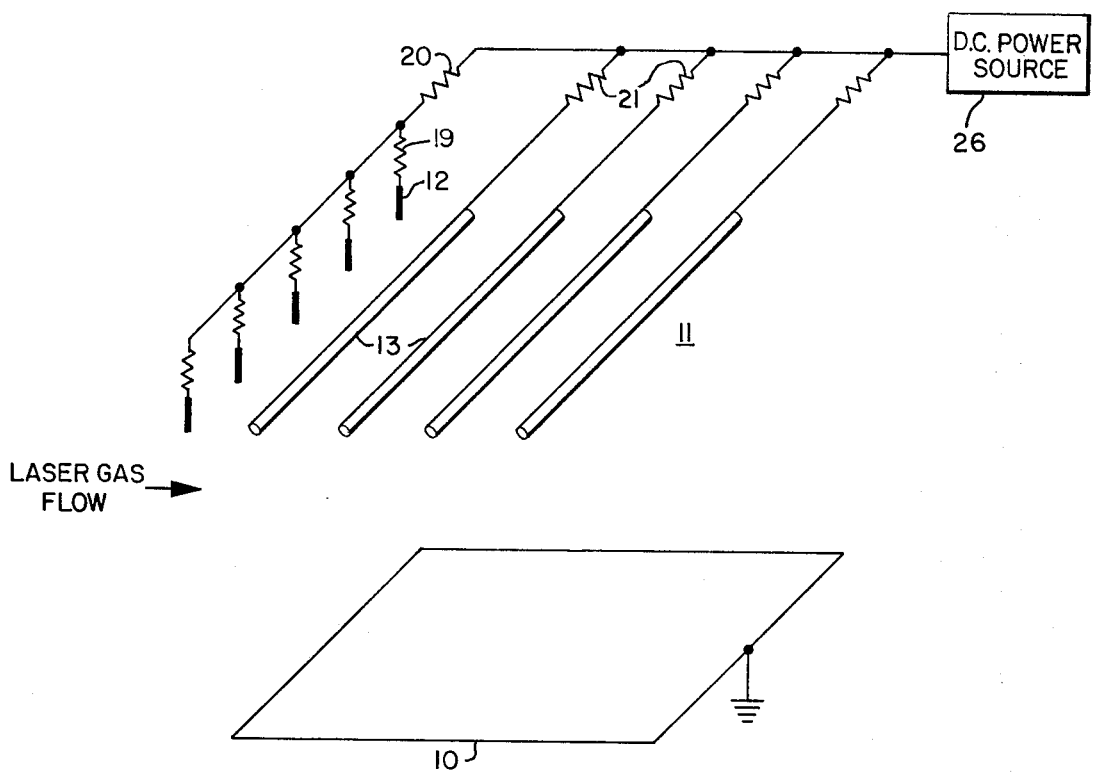
FIGS. 4 and 5 are schematic illustrations of a simplified cathode electrode configuration employing a combination of discrete cathode pin elements and elongated cathode elements in an X-Y array.
Figure 5:
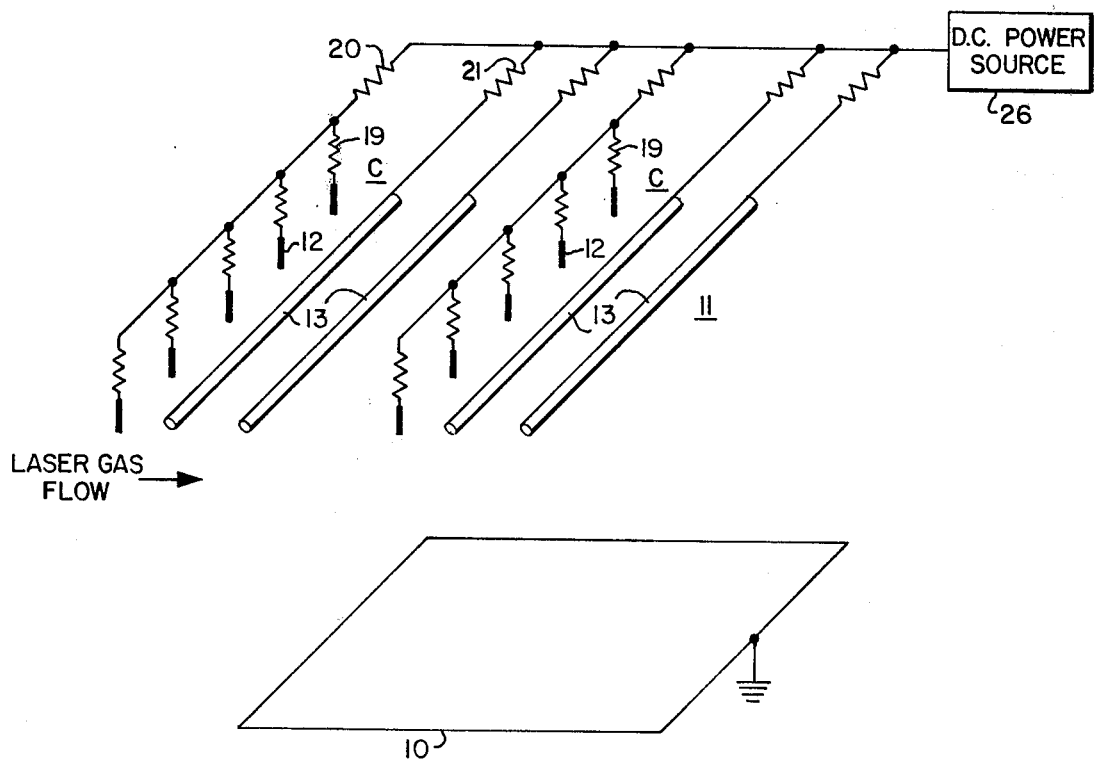

Referring to FIGS. 4 and 5 there is schematically illustrated variations to the prior art X-Y array of cathode pin elements as illustrated in FIG. 3. The variation in the prior art X-Y array consists of the substitution of an elongated cathode element 13 with its associated single ballast resistor 21 for one or more of the rows of discrete cathode pin elements and associated plurality of ballast resistors. While the embodiments of FIGS. 4 and 5 illustrate the elongated cathode element 13 as being a rod member it will be apparent from the following discussion that the elongated continuous cathode element 13 may take the form of sharp-edged blade member or other appropriate aerodynamic shape. In the embodiment of FIG. 4, an upstream row of discrete cathode pin electrodes 12 functions in a preionization mode by introducing free electrons into the laser gas flow for a subsequent excitation in the laser discharge volume defined between the elongated cathode elements 13 and the planar anode electrode 10.

The significant reduction in number of ballast resistors realized by the implementation of FIG. 4 not only reduces cost and manufacturing problems but improves operation by reducing the likelihood of electrical shorting between adjacent ballast resistors and between adjacent cathode pin elements.

The schematic embodiment of FIG. 5 illustrates redundant combinations C of one or more rows of cathode pin elements 12 and elongated cathode elements 13. The electrode combinations C extend in a downstream direction with each combination C providing separate preionization and excitation modes of operation and cooperating with the common anode electrode 10 to define a plurality of discharge volumes comprising an overall laser discharge volume. In the embodiment of FIG. 5, the intermixing of rows of discrete cathode pin elements 12 with the elongated cathode elements 13 has been shown experimentally to reinforce the tendency toward equal partition of discharge current in the transverse direction.

The concept of FIG. 5 is particularly desirable for applications requiring an extended discharge volume. The elongated cathode element 13 does not exhibit predetermined points of ionization. Thus if the rows of cathode pin elements 12 were limited to an initial upstream position as shown in FIG. 4, and followed by numerous cathode elements 13, the cathode elements 13 would not effectively compensate for unequal ionization by the discrete cathode pin elements 12. This could adversely affect the homogeneity of the discharge.

By interspersing rows of pre-ionizing cathode pin elements 12 among the elongated cathode elements 13 this potential determination in the homogeneity of the discharge is averted by repeating the preionization step at one or more downstream locations. Further improvement in maintaining the desired homogenous characteristic of the discharge is realized by staggering the respective rows of cathode pin elements 12.

Figure 6:
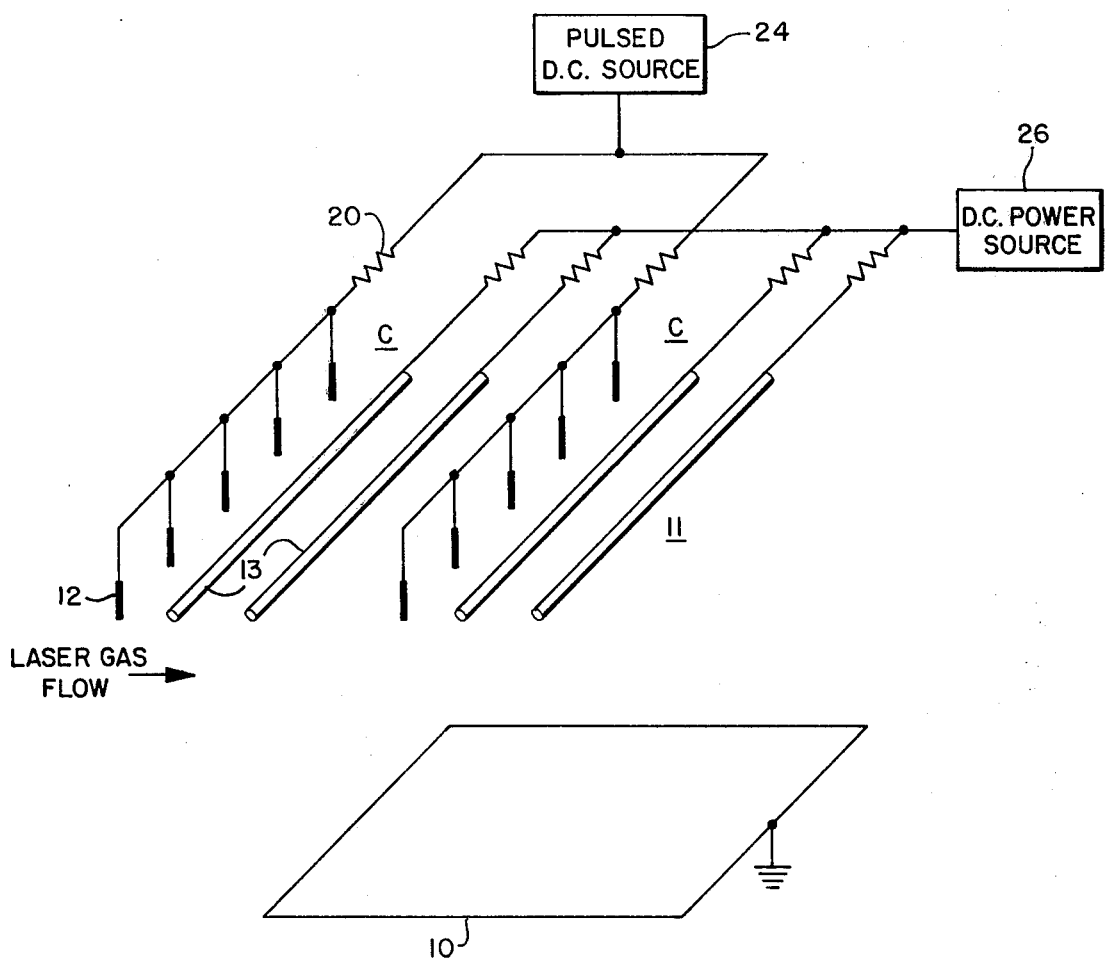
FIG. 6 is a variation of FIGS. 4 and 5 schematically illustrating an alternate electrical excitation scheme.

While the embodiments of FIGS. 4 and 5 illustrated both the cathode pin elements 12 and the elongated cathode elements 13 being connected to a DC power source, an alternate electrical excitation configuration is illustrated in FIG. 6.

In the embodiment of FIG. 6, the rows of cathode pin elements 12 are connected to a pulsed DC source 24 whereas the cathode elements 13 are connected to nonpulsed DC source 26. In this configuration the level of DC excitation to the cathode elements 13 from DC source 26 can be less than the level required to sustain the discharge, with the discharge being controlled by the pulsed excitation of the cathode pin elements 12 operating in a preionizing mode. The pulsed DC source 24 can operate to modulate the discharge.

Further, as illustrated in FIG. 6, the individual ballast resistors 19 associated with the cathode pin elements 12 can be eliminated and the row resistor 20 sized to provide appropriate ballast.

We claim:

1. In a gas laser apparatus including a laser housing containing a flowing laser gas medium, the combination of,
    spaced apart cathode and anode electrodes defining a main laser discharge volume therebetween, said anode being a planar electrode, said cathode electrode comprised of rows of cathode elements including a combination of one or more rows each consisting of a plurality of discrete cathode pin elements being perpendicular to said planar anode electrode, and one or more rows, each consisting of a single elongated cathode element, all of said cathode elements being within said main laser discharge volume,
    DC excitation means,
    ballast means coupling said DC excitation means to said rows of cathode elements, and
    optical elements disposed relative to said discharge volume to define a laser optical cavity.

2. In a gas laser apparatus including a laser housing containing a flowing laser gas medium, the combination of,
    spaced apart cathode and anode electrodes defining a main laser discharge volume therebetween, said anode electrode being a planar electrode, said cathode electrode comprised of rows of cathode elements including the combination of one or more rows each consisting of a plurality of discrete cathode pin elements, said pin elements being perpendicular to said planar anode electrode, and one or more rows each consisting of a single elongated cathode element, all of said cathode elements being within said main laser discharge volume defined by said spaced apart cathode and anode electrode,
    a pulse electrical excitation source operatively connected to said rows of discrete cathode pin elements to modulate the laser discharge,
    a DC electrical excitation source connected to said rows of elongated cathode elements, and
    optical elements positioned relative to said discharge volume to define a laser optical cavity.

* * * * *

Notice of Adverse Decision in Interference

In Interference No. 100,557, involving Patent No. 4,145,669, R. V. Babcock, J. L. Pack and R. L. Hundstad, CATHODE ELECTRODE CONFIGURATION FOR GAS LASER SYSTEM, final judgment adverse to the patentees was rendered June 29, 1983, as to claim 1.

[*Official Gazette February 7, 1984.*]